March 21, 1967 H. RIEMENSCHNEIDER 3,310,337
AUTOMATIC COUPLING AND DECOUPLING DEVICE
Filed Jan. 5, 1965
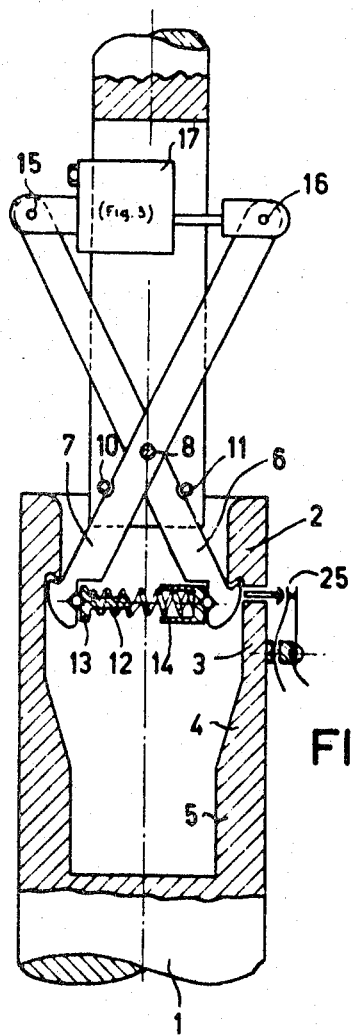
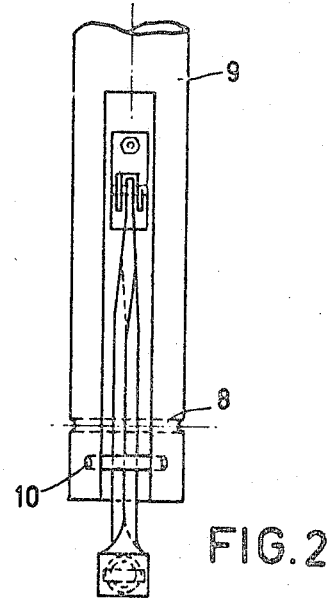
FIG.2
FIG.1
FIG.3
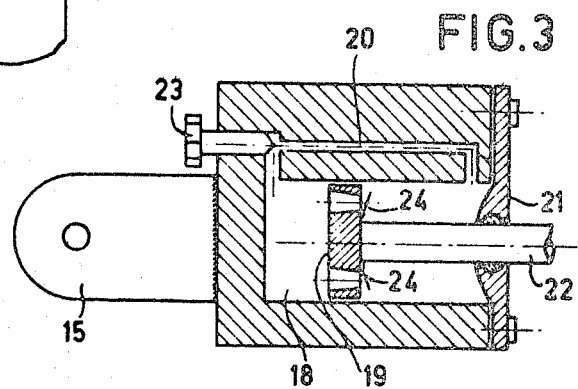
INVENTOR
Helmut RIEMENSCHNEIDER
ATTORNEYS United States Patent Office 3,310,337
Patented Mar. 21, 1967

3,310,337
AUTOMATIC COUPLING AND DECOUPLING DEVICE
Helmut Riemenschneider, Mol-Donk, Belgium, assignor to European Atomic Energy Community—Euratom, Brussels, Belgium
Filed Jan. 5, 1965, Ser. No. 423,556
Claims priority, application Germany, Mar. 9, 1964, E 26,576
8 Claims. (Cl. 294—97)

The present invention relates to an automatic coupling and decoupling device between two elements which are movable in relation to one another, in particular between a manipulator and a sample container in a nuclear reactor.

Due to the large distance from which the movement of sample containers in nuclear reactors must be controlled, it would be desirable to limit the number of the movable members of a manipulator which are controllable independently from each other since each of these members requires its own movement transfer means (motors with electrical control circuits or lever mechanisms). For example, in this respect, the known manipulators which are constructed following human hands are very expensive; their universal usability, on the other hand, is only seldom utilized, since the objects to be grasped and transported fall into only a few types, depending on shape and weight.

Simpler manipulators are based on using only objects of a predetermined shape adapted to the manipulator. In this case the members are reduced to the functions of coupling, decoupling and transportation. The adaptation of the shape of the objects to be transported may consist in a hook and/or in slide surfaces in which the manipulator is guided before the power locking is established.

This invention utilizes the possibility of optimum adaption of the manipulator and the object. Furthermore, it avoids transfer means for the function of coupling and decoupling and replaces them by suitable movement of the manipulator in a direction towards or away from the object to be transported.

The invention relates to a device for coupling and decoupling two elements wherein the first element has, in its direction of movement, at least two slide surfaces on which slide a corresponding number of spring-pressed grasping arms of the second element upon relative movement of the elements with respect to each other, the sliding surfaces and also the sliding arms presenting each a nose-like bulge which in a determined first position of the elements with respect to each other engage one another and produce the power coupling in the direction of movement.

The invention resides in that the slide surfaces each have a further smoothly rising prominence which is brushed only upon bringing the elements closer together past the first position and in that damping members are provided which retard the unstressing of the springs so that decoupling is obtained, the slide arms being lifted from the slide surfaces by short temporary approach of the elements from the first position and being thus lifted away from the bulges of the slide surfaces before the retarding effect of the damping members ceases to operate.

The foregoing and other features of the invention are explained in further detail hereinunder with reference to a preferred through not exclusive embodiment of the invention illustrated in FIGURES 1-3.

FIG. 1 is a cross-section of the arrangement according to the invention; since of the two elements to be coupled only those parts are of interest which effect the coupling, all other parts have been omitted.

FIG. 2 is an elevation of the manipulator seen at 90° to FIG. 1.

FIG. 3 is a detailed section of a damping member.

The sample container, or first element, is provided at the top with a vertical holder rod 1 having a coaxial bore at the top thereof. With reference to FIG. 1, this bore may be divided into four zones. The uppermost zone 2 narrows from a funnel-like edge to a first diameter D1. At the junction to the next zone 3 which has a diameter $D2 > D1$ there is provided a bulge nose-shaped in cross-section where the power coupling takes place.

Next downwardly there follows a tapering zone 4 where the diameter steadily decreases to $D3 < D1$. The last zone 5 of the bore has a diameter D3.

The jacket surface of the bore forms the slide surface for two grasping arms 6 and 7 which are connected with the second element (the manipulator). The outer ends of the arms are shaped in such a way that they can engage behind the nose-like bulges of the slide surfaces and thus establish the power coupling. FIGURE 1 illustrates precisely such a position.

In the present embodiment, the two grasping arms 6 and 7 are crossed in scissor fashion and are connected at the cross point with a bolt 8 which is secured to the manipulator shaft.

As seen in FIG. 2, the manipulator itself consists essentially of a shaft 9 which is provided at the lower end with a slot in the axial direction. The two grasping arms 6 and 7 are mounted on the bolt 8 within this slot. Two pins 10 and 11 parellel to bolt 8 serve as abutments and prevent a spring 12 from pressing the grasping arms apart beyond the abutment. The spring 12 is located between the lower ends of the two grasping arms 6 and 7. It engages on both sides in guide elements 13 and 14 which are connected to the grasping arms by means of a roller so that upon stretching of the spring only axially directed forces occur in the spring.

The rear ends of the two grasping arms 6 and 7 are connected according to the invention through yokes 15 and 16 with a damping member 17 which opposes the bias of the spring and, in particular, retards stretching of the spring. Preferably, the damping member only has a retarding effect in one direction.

FIG. 3 shows one possible embodiment of such a damping member. It consists of a cylinder with a large bore 18 in which is movably mounted a piston 19 and with a bypass channel 20 of small cross-section extending from one end to the other of the large bore 18. A cover 21 closes the large bore and seals over at the piston rod 22.

An adjustable conical valve 23 reaches into the bypass channel and makes it possible to adjust the retarding effect. One or more one-way valves 24, for example, conical valves or check valves, are mounted on the piston itself and serve to guide the liquid, which entirely fills a bore 18, through the piston when the latter is pressed into the bore. When the piston is pulled out of the bore the liquid has to flow through the bypass channel because the valves 24 are closed.

The function of the above-described arrangement is as follows:

For coupling of the manipulator with the sample container the grasping arms are brought toward the funnel-like opening. In the first zone 2 of this opening the grasping arms 6 and 7 are pressed together against the action of the spring 12. As soon as the power locking position is reached, the spring presses the arms behind the bulge so that the container can be lifted and transported.

For decoupling, the container must first be set down; then the manipulator is further lowered so that the lower ends of the grasping arms slide along the second, third, and fourth zones 3–5 of the coaxial bore of the holding rod 1. In the third zone 4 the arms are pressed together to a spacing D3 which is smaller than the diameter D1 of the first zone. The manipulator can then be rapidly pulled out of the opening because the damping member delays the stretching of the spring until the arms are moved past the bulge.

In this manner it is possible to avoid the provision of a special device for releasing the power coupling; the function of the same is replaced by suitable movement of the manipulator which does not represent any added cost since the manipulator must, in any case, be movable at least in the direction of its axis.

For monitoring the coupling device, lamps may be provided which switch on when the power coupling has occurred. These lamps and a battery, which are not shown in the drawing, are preferably mounted on the container. A contact or several contacts evenly distributed over the circumference, for controlling the lamps, are secured to the bulge in such a way that they are closed when the arms engage behind the bulge. Such a contact is shown at 25 in FIG. 1.

While the invention has been described in connection with a preferred embodiment tested in practice, the same does not, however, represent the only possibility within the spirit of the invention. For example, the number of arms may be increased to three, four, six, or eight. The arms may engage a suitably shaped outer surface instead of the inner surface and they need not be crossed over in scissor fashion.

Furthermore, instead of the compression spring, a tension spring may be provided at the opposite end of the scissor arrangement.

I claim:

1. In an automatic coupling and decoupling device between two elements movable towards and away from each other, in particular between a manipulator and a sample container in a nuclear reactor, wherein the first element has at least two slide surfaces along the direction of movement and the second element has a corresponding number of spring pressed grasping arms which are slidable along the slide surfaces upon relative movement between the two elements and wherein the grasping arms and the slide surfaces have nose-like bulges which interengage in a predetermined first relative position of the elements and thus produce a power coupling in the direction of movement, the improvement consisting in that the slide surfaces each have a further smoothly rising prominence which is engaged upon approach of the elements beyond said first position and in that a damping member is provided to delay unstressing of the spring so that decoupling occurs by raising the grasping arms from the slide surfaces by rapid movement of the elements beyond said first position, whereby the arms pass over the bulge of the slide surfaces before the retarding effect of the damping member is over.

2. Coupling and decoupling device according to claim 1, wherein the slide surfaces are formed by the surface of a cylindrical tube provided with annular bulges and having its axis in the direction of movement.

3. Coupling and decoupling device according to claim 2, wherein the cylindrical tube has at one face thereof a funnel-like opening through which the grasping arms are introduced.

4. Coupling and decoupling device according to claim 1, wherein there are two grasping arms which are pivotally mounted on the second element and are in engagement with said spring and said damping member.

5. Coupling and decoupling device according to claim 4, wherein the two grasping arms are arranged in scissor fashion and are borne at the crossing point.

6. Coupling and decoupling device according to claim 1, wherein electric contacts are mounted at the nose-like bulges of the sliding surfaces and are actuated by the grasping arms when the same engage the bulges, said contacts closing a signal current circuit which indicates the power coupling of the two elements.

7. Coupling and decoupling device according to claim 1, wherein the damping member only has a damping effect in one direction of movement of the grasping arms, while its damping effect in the opposite direction is insignificant.

8. Coupling and decoupling device according to claim 7, wherein the damping member consists of a liquid filled cylinder and a piston movable therein with valves which allow passage of the liquid only in one direction, while a bypass channel of adjustable flow resistance leads the liquid upon movement of the piston in the opposite direction.

References Cited by the Examiner

UNITED STATES PATENTS

| 3,064,855 | 11/1962 | Fischer | 294—97 X |
| 3,164,406 | 1/1965 | Barry | 294—81 X |

FOREIGN PATENTS

| 1,190,100 | 3/1959 | France. |
| 1,267,296 | 6/1961 | France. |

M. HENSON WOOD, JR., *Primary Examiner.*

C. H. SPADERNA, *Assistant Examiner.*